US011301712B2

(12) United States Patent
He et al.

(10) Patent No.: US 11,301,712 B2
(45) Date of Patent: Apr. 12, 2022

(54) POINTER RECOGNITION FOR ANALOG INSTRUMENT IMAGE ANALYSIS

(71) Applicant: SAP SE, Walldorf (DE)

(72) Inventors: Jie He, Shanghai (CN); Yanbing Li, Shanghai (CN); Hong Liu, Shanghai (CN); Yubo Lou, Shanghai (CN); Lin Cai, Shanghai (CN); Xuemin Wang, Shanghai (CN)

(73) Assignee: SAP SE, Walldorf (DE)

( * ) Notice: Subject to any disclaimer, the term of this patent is extended or adjusted under 35 U.S.C. 154(b) by 342 days.

(21) Appl. No.: 16/677,481

(22) Filed: Nov. 7, 2019

(65) Prior Publication Data

US 2021/0142099 A1 May 13, 2021

(51) Int. Cl.
*G06K 9/46* (2006.01)
*G06T 7/66* (2017.01)
(Continued)

(52) U.S. Cl.
CPC ....... *G06K 9/4609* (2013.01); *G05B 13/0265* (2013.01); *G06K 9/6247* (2013.01);
(Continued)

(58) Field of Classification Search
CPC ............ G06T 2207/20081; G06T 7/66; G06K 2209/05; G06K 2209/09
See application file for complete search history.

(56) References Cited

U.S. PATENT DOCUMENTS

| 5,930,383 A | * | 7/1999 | Netzer | ................... | G01B 11/24 |
| | | | | | 382/154 |
| 6,591,005 B1 | * | 7/2003 | Gallagher | ............ | G06K 9/3208 |
| | | | | | 382/154 |

(Continued)

FOREIGN PATENT DOCUMENTS

| CN | 105260709 | 1/2016 |
| CN | 108921176 | 11/2018 |

OTHER PUBLICATIONS

Chen et al., "Computer Vision-Based Approach for Reading Analog Multimeter," *Applied Sciences*, https://www.mdpi.com/2076-3417/8/8/1268, 33 pages, Jul. 31, 2018.

(Continued)

*Primary Examiner* — Yosef Kassa
(74) *Attorney, Agent, or Firm* — Klarquist Sparkman, LLP

(57) ABSTRACT

Systems and processes for identifying a pointer in an image of an analog instrument are provided herein. An instrument contour in the image corresponding to the analog instrument may be identified. A plurality of candidate pointer contours in the image may be identified and screened using one or more geometric property screening techniques including an evaluation of a geometric area, a distance parameter, and/or a gravity center of the plurality of candidate pointer contours. Principal component analysis (PCA) may be performed to select an identified pointer contour from among the reduced plurality of candidate pointer contours. A linear regression model may be applied to pixel points in the (Continued)

contour area of the identified pointer contour and a slope and angle of an associated pointer represented by the identified pointer contour may be determined based on an output of the linear regression model.

20 Claims, 8 Drawing Sheets

(51) Int. Cl.
    *G06K 9/62*     (2006.01)
    *G05B 13/02*     (2006.01)
    *G06N 20/00*     (2019.01)
    *G06T 7/73*     (2017.01)

(52) U.S. Cl.
    CPC ............... *G06N 20/00* (2019.01); *G06T 7/66* (2017.01); *G06T 7/73* (2017.01); *G06T 2207/20081* (2013.01)

(56) References Cited

U.S. PATENT DOCUMENTS

| | | | |
|---|---|---|---|
| 7,714,740 B2 | 5/2010 | Lipman | |
| 8,570,320 B2* | 10/2013 | Izadi | A63F 13/65 345/420 |
| 8,732,025 B2 | 5/2014 | Gokturk et al. | |
| 8,786,706 B2 | 7/2014 | Kennedy et al. | |
| 9,113,077 B2* | 8/2015 | Mirzaei | G01C 21/206 |
| 9,137,511 B1* | 9/2015 | LeGrand, III | G01B 11/2545 |
| 9,509,981 B2* | 11/2016 | Wilson | G06F 3/04815 |
| 10,289,925 B2 | 5/2019 | Farooqi et al. | |
| 2019/0130214 A1 | 5/2019 | N. et al. | |

OTHER PUBLICATIONS

Zheng et al., "A Robust and Automatic Recognition System of Analog Instruments in Power System by Using Computer Vision," *Measurement* 92, pp. 413-420, Jun. 23, 2016.

Yang et al., "An Image-Based Intelligent System for Pointer Instrument Reading," *2014 4th IEEE International Conference on Information Science and Technology*, pp. 780-783, Apr. 26-28, 2014.

Qi et al, "Automatic Alignment System Based on Center Point Recognition of Analog Measuring Instruments Dial," *IECON 2013—39th Annual Conference of the IEEE Industrial Electronics Society*, pp. 5532-5536, Nov. 10-13, 2013.

Alegria et al., "Automatic Calibration of Analog and Digital Measuring Instruments Using Computer Vision," *IEEE Transactions on Instrumentation and Measurement*, vol. 49, No. 1, pp. 94-99, Feb. 2000.

Sablatnig et al., "Automatic Reading of Analog Display Instruments," *Proceedings of 12th International Conference on Pattern Recognition*, pp. 794-797, 1994.

Belan et al., "Segmentation-Free Approaches of Computer Vision for Automatic Calibration of Digital and Analog Instruments," *Measurement* 46, pp. 177-184, Jun. 28, 2012.

\* cited by examiner

POINTER RECOGNITION FOR ANALOG INSTRUMENT IMAGE ANALYSIS

FIELD

The present disclosure generally relates to computer vision and identifying targeted objects in an image. Particular implementations relate to evaluating contours of an image of an analog instrument to identify a pointer of the analog instrument and determining a pointing direction and/or angle of the identified pointer.

BACKGROUND

Automatic reading of analog instruments is increasingly useful in information retrieval and automatic control in intelligent systems in industry. Computer vision and machine learning techniques may utilize several steps in software programming after preliminary image preprocessing is performed. For example, a first step may include identifying a pointer (e.g., an element of an analog instrument that points to an indication of a measured value) in an image of an analog instrument. It is difficult to precisely recognize the object of the pointer in an image because the features of pointer may not be unique. Furthermore, high noise in the image may be a source of additional complications in recognizing the pointer. As a result, irrelevant object contours may be easily confused with the pointer contour. An angle at which the pointer lies may be used to identify a measured value at which the pointer is directed (e.g., indicating a reading of the analog instrument at the time the image was captured). A subsequent determination of the angle at which the recognized pointer lies is subject to the preciseness of pointer recognition results. Accordingly, the above-described issues with identifying a pointer contour may cause uncertainty of the results of reading the instrument display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

For object recognition of a pointer in an image of an analog instrument, contour detection may be performed by applying computer vision techniques to the image. As many contours may be found in the image, most of which are irrelevant to the pointer in the background, the contours (e.g., candidate contours) may be screened to reduce the number of candidate contours. In order to solve this issue, pattern recognition technologies are employed to distinguish the real pointer from background objects for subsequent processes. For example, the screening process is based on the features of the pointer contour versus irrelevant (non-pointer) contours, which enables the process to discern between the two kinds of objects. The screening includes performing geometric screening (e.g., based on geometric area, distance parameters, and gravity center parameters) and, if more than one candidate pointer contour remains after the geometric screening, performing principal component analysis (PCA) to select one of the remaining candidate pointer contours based the contribution rates of the principal components of the pixel points within the contours of remaining candidate pointers. After the pointer is successfully recognized, the pointer's slope may be calculated by a statistical method on the pixel points inside the pointer contour area. In this way, the calculated slope may provide a more accurate reading of the analog instrument than other techniques, as the slope calculation is performed on a pointer contour identified with a high degree of precision.

The foregoing and other objects, features, and advantages of the invention will become more apparent from the following detailed description, which proceeds with reference to the accompanying figures.

DETAILED DESCRIPTION

Figure 1:
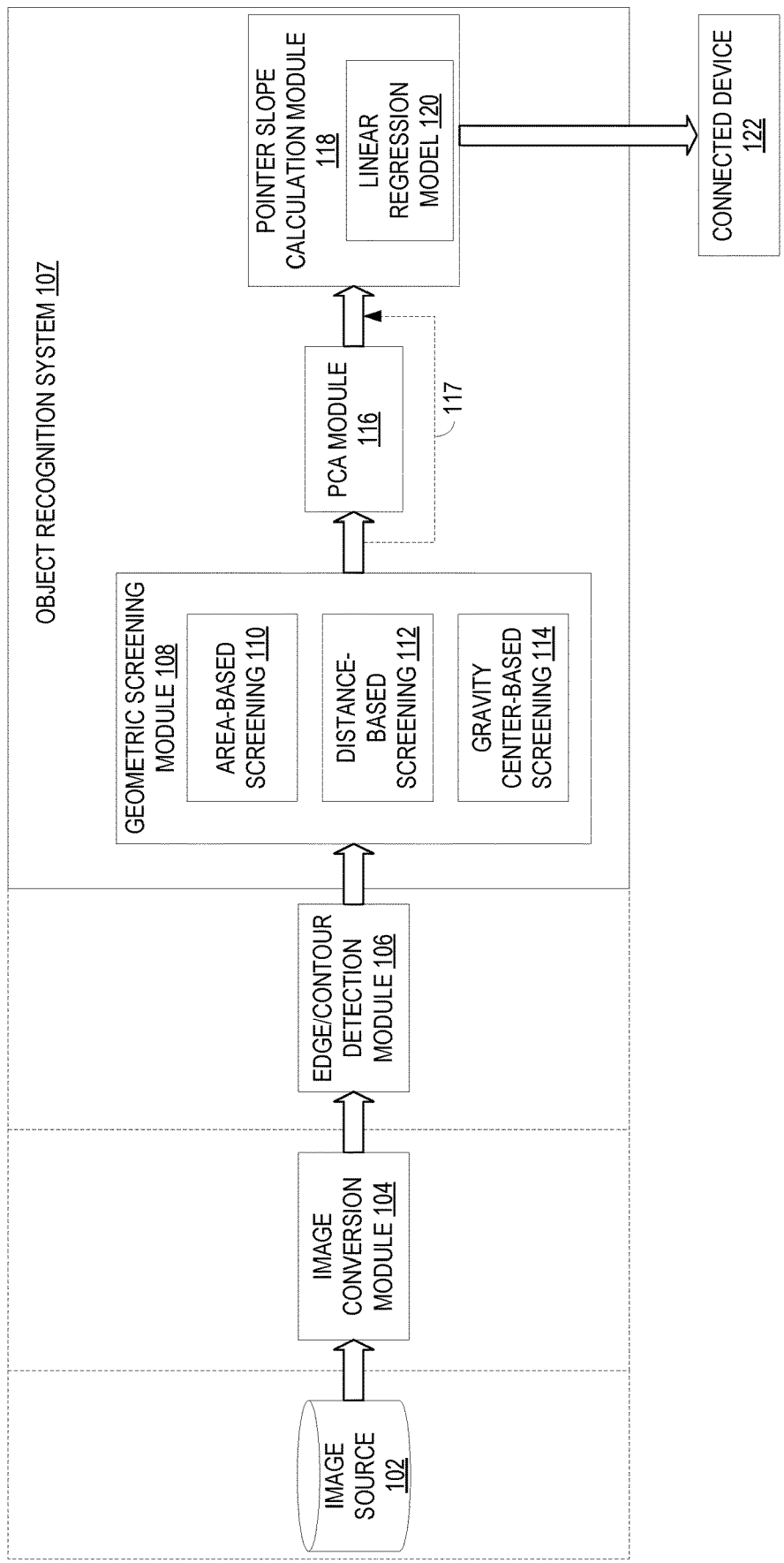
FIG. 1 is a schematic diagram depicting an example image analysis pipeline for pointer recognition in an image.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Generally, an automatic reading of an analog instrument relies upon pattern recognition of a pointer of the analog instrument in an image and calculation of an angle/slope of the pointer, which may indicate an associated measurement value on the analog instrument to which the pointer is directed. Images of analog instruments may be noisy and/or include background features that are not relevant to the pointer. Accordingly, when applying computer vision techniques to identify contours in the image, many irrelevant contours (e.g., irrelevant to the pointer) may be identified, increasing a difficulty in selecting an appropriate contour that corresponds to the pointer. As described above, inaccurate results in identifying a pointer may further negatively affect the analysis of the pointer slope/angle, which in turn reduces accuracy in the reading of the analog instrument.

In some approaches, a reference template corresponding to the pointer may be used to locate matching contours in an attempt to increase accuracy of pointer recognition. However, pointer shapes may vary in detail between different analog instruments, and extra processing steps (e.g., identifying the analog instrument, locating an associated pointer template, etc.) and reduced compatibility (e.g., the approach may not be usable if a pointer template is not available or the analog instrument cannot be identified, or the approach may be less effective if artifacts and/or distortions in the image reduce similarities between the imaged pointer and the reference pointer) may be experienced in the reference template approach.

Performing automatic reading of an analog instrument according to the present disclosure may remedy or avoid any or all of the above-described problems. Pointers of different analog instruments may share general geometric features, such as a long, slender shape, a location within the analog instrument body, and an internally-located gravity center. Pointer recognition according to the present disclosure may use these geometric features to screen out irrelevant contours of an image and narrow candidate pointer contour candidates substantially or to a single identified pointer contour. The disclosed pointer recognition may further selectively utilize Principal Component Analysis (PCA) when more than one candidate pointer contour remains after geometric screening to select an identified pointer contour. Given the long and slender shape of the instrument pointer, the pixel points within the contours of the candidate pointers are deemed to be sample data for PCA, which will measure the closeness of those pixel distributions to a linear fashion via the contribution rates as the metrics of the principal components. Since the pointer may lie in any direction, the PCA will find out the very direction of a contour in which the pixel points distribute with the greatest explained variance ratio and/or greatest contribution rate. In this way, the pointer contour may be identified accurately using reduced computing resources, as the majority of the contours may be processed using the geometric screening, which utilizes fewer computing resources than PCA analysis or other techniques. Furthermore, the pointer recognition described herein does not require use of a particular pointer reference template, which greatly increases compatibility and scalability of the approach.

The disclosure also describes mechanisms for identifying a slope and angle of the identified pointer contour using linear regression to generate a fitted line across the contour, the slope and angle of which may be determined (e.g., by applying an inverse tangent function thereto) and associated with the pointer of the analog instrument. As the screening criteria described herein may be able to distinguish a pointer contour from numerous contours in the background with an accuracy greater than 99%, the accuracy of the subsequent slope and angle determination may likewise be improved relative to other approaches. The resulting determination of the pointer location, angle, and/or slope may be used to automatically and intelligently derive an analog instrument reading (e.g., without human intervention), which may be used in various applications, such as machine learning applications (e.g., where the reading is applied as training data or as input to generate a result from a machine learning operation of a machine learning system) and/or automatic control systems (e.g., where the reading is used to generate a corresponding control signal to control operation of a system based on the reading).

FIG. 1 shows an example image processing pipeline 100 and associated systems/modules, at least a portion of which may be used in the various examples of object (e.g., pointer) recognition described herein. An image source 102 may include one or more storage devices storing one or more images (e.g., including images referred to herein as "original" images) for processing by the image processing pipeline 100. The image source 102 may be remote from (and communicatively connected to) one or more image processing systems used later in the pipeline 100 in some examples. In other examples, the image source 102 may include local storage of one or more of the image processing system(s) used later in the pipeline 100. The images stored in image source 102 may be captured by any suitable image capture device, such as a digital camera that captures digital images (e.g., still or video) of an analog instrument (e.g., a physical, real-world instrument that provides an output of a measured variable as a continuous function of time). For example, the image capture device may substantially continuously capture a stream of images of an analog instrument and the image source 102 may correspond to a stream buffer for temporarily storing the stream of images for processing by the pipeline 100 (e.g., to provide substantially real-time automatic readings of the analog instrument). In other examples, the image source 102 may be or include the image capture device, such that images are provided directly from the image capture device to downstream modules in the pipeline 100.

An image (e.g., an "original" image) may be retrieved from or otherwise transmitted from the image source 102 to an image conversion module 104. The image conversion module may include instructions executable by a processor to convert the image from the image source 102 into a binary-value image and/or to otherwise prepare the image (e.g., crop, resize, filter, etc.) for later processing in the pipeline 100.

The output of the image conversion module 104 (e.g., referred to generally as a converted image, which may include a binary-value image) may be retrieved and/or otherwise received by an edge/contour detection module 106. The edge/contour detection module 106 may include instructions executable by a processor to identify contours (optionally including identifying edges) in the converted image (e.g., based on detected edges). Edges in the converted image may be detected based on properties of the pixels in the converted image, an include points in the image where image brightness or color shifts by more than a threshold amount (e.g., points that include a pixel of a first color, such as black, adjacent a pixel of a second color, such as white, in a binary-value image). Contours in the converted image may be detected by identifying closed curves of points or line segments that represent boundaries of objects in the image (e.g., connected points or pixels detected as edges that form closed curves or line segments). Although illustrated as a single module, it is to be understood that edge detection and contour detection may be performed separately (e.g., by different modules) in some examples.

As will be described in more detail below, an image of an analog instrument may include contours associated with various features related to the analog instrument (e.g., markings on the instrument, a pointer of the instrument, an overall boundary/outline of the instrument, etc.) as well as contours associated with background objects and/or noise/artifacts in the image. In order to isolate a contour associated with a targeted object (e.g., the pointer of the instrument), the output of the edge/contour detection module 106 may be provided to an object recognition system 107 that screens out contours having features that are estimated to be unrelated to features of the targeted object (e.g., the pointer). The output of the edge/contour detection module 106 may include an identification and/or representation of the contours in the image (e.g., candidate object/pointer contours), each of which may have associated parameters such as a location of the contour in the image, a size of the contour, a gravity center of the contour, and/or other parameters.

The output of the edge/contour detection module 106 may first be provided to a geometric screening module 108 for an initial screening phase. The geometric screening module 108 may include instructions executable by a processor to generate subsets of the candidate object contours that meet selected geometric parameters associated with a targeted object. It is to be understood that while examples described herein may refer to detection of a pointer of an analog instrument, the disclosed features may also be applied analogously to detection of other objects (e.g., other long and slender objects) in images. Example geometric screening modules include an area-based screening module 110, a distance-based screening module 112, and a gravity center-based screening module 114.

The area-based screening module 110 may be configured to identify a subset of the candidate pointer contours based on the geometric area of each of the plurality of candidate pointer contours. For example, each of the pointer contours in the subset generated by the area-based screening module 110 may have a respective geometric area that is between a selected minimum area and a selected maximum area.

The distance-based screening module 112 may be configured to identify a subset of the plurality of candidate pointer contours based on a distance parameter of each of the plurality of candidate pointer contours. For example, each of the pointer contours in the subset generated by the distance-based screening module 112 may have a distance between a respective gravity center of the pointer contour and a geometric center of the instrument contour that is less than a selected threshold distance.

The gravity center-based screening module 114 may be configured to identify a subset of the plurality of candidate pointer contours based on a gravity center location of each of the plurality of candidate pointer contours. For example, each of the pointer contours in the subset generated by the gravity center-based screening module 114 may have a gravity center that is inside of the respective candidate contour.

As will be described in more detail below, the different geometric screening modules may be utilized in any suitable order (e.g., based on estimated performance and/or resource usage of the different modules for given targeted object properties and/or image properties). The generation of subsets of candidate pointer contours by the different geometric screening modules may build upon one another to sequentially reduce the candidate pointer contours, such that the subset generated by a first-executed module is further reduced via execution of a second module, the output subset of which is further reduced via execution of a third module. In some examples, one or more of the modules of geometric screening may not be used during processing of an image if an earlier-executed module results in the elimination of all except one candidate pointer contour (e.g., resulting in the identification of a single pointer contour amongst the candidate object contours).

The output of the geometric screening module 108 may be retrieved or otherwise received by the principal component analysis (PCA) module 116. The PCA module 116 may include instructions executable by a processor to analyze the reduced (e.g., remaining) candidate pointer contours via PCA and to select a pointer contour from among the reduced candidate pointer contours (e.g., reduced by the geometric screening module 108). Among the candidate contours that are output by the geometric screening described above, the shapes of the irrelevant contours are usually irregular, by contrast to the regularly long and slender shapes of the real pointer contour. This morphological feature may help to determine the most likely pointer contour by selecting the closest contour to a straight line via PCA, as the pointer contour usually has the greatest variance in the direction of the first principal component. Analyzing the pointer contours via PCA may include determining a contribution rate and/or other parameters of the remaining pointer contours and comparing the determined parameters to one another. The selected pointer contour may be selected as the pointer contour that has the greatest contribution rate of the first principal component of the reduced candidate pointer contours.

In some examples, where the geometric screening module 108 outputs a single pointer contour as a result of performing one or more of the above-described geometric screening operations, the PCA module 116 may be bypassed (e.g., as indicated at 117) and the pointer contour selected by the geometric screening module 108 may be provided directly to a pointer slope calculation module 118. In other examples, the pointer contour selected by the PCA module 116 is provided to the pointer slope calculation module 118.

The pointer slope calculation module 118 may include instructions executable by a processor to apply a linear regression model 120 to pixel points in the contour area of the selected pointer contour output by the PCA module 116 or geometric screening module 108. The instructions of the pointer slope calculation module 118 may further be executable to determine a slope and angle of an associated pointer represented by the selected pointer contour based on an output of the linear regression model 120. The linear regression model 120 may include a machine learning model trained by pixel points in a contour area of the selected pointer contour.

The output of the pointer slope calculation module 118 may be provided (e.g., transmitted) to a connected device 122. The connected device 122 may represent any device suitable to use (e.g., further process), store, present, and/or output the information regarding the detected pointer slope, such as an output device (e.g., a display) and/or a computing system that performs further processing and/or other actions based on the calculated slope of the pointer. For example, the connected device may include a computing system configured to map the calculated slope of the pointer to an associated value/reading of the analog instrument, to output information relating to the calculated slope of the pointer and/or associated value/reading of the analog instrument, such as an alert), and/or to control a machine based on the value/reading of the analog instrument to which the pointer is directed. In some examples, the calculated slope of the pointer may be provided as input to a machine learning system (e.g., in addition to other operating parameters of an associated system) in order to train a machine learning model or perform machine learning-based operations. In some examples, the connected device 122 may be part of the same computing system that performs the pointer recognition (e.g., the object recognition system and/or any device that performs any of the operations in pipeline 100).

Figure 2:
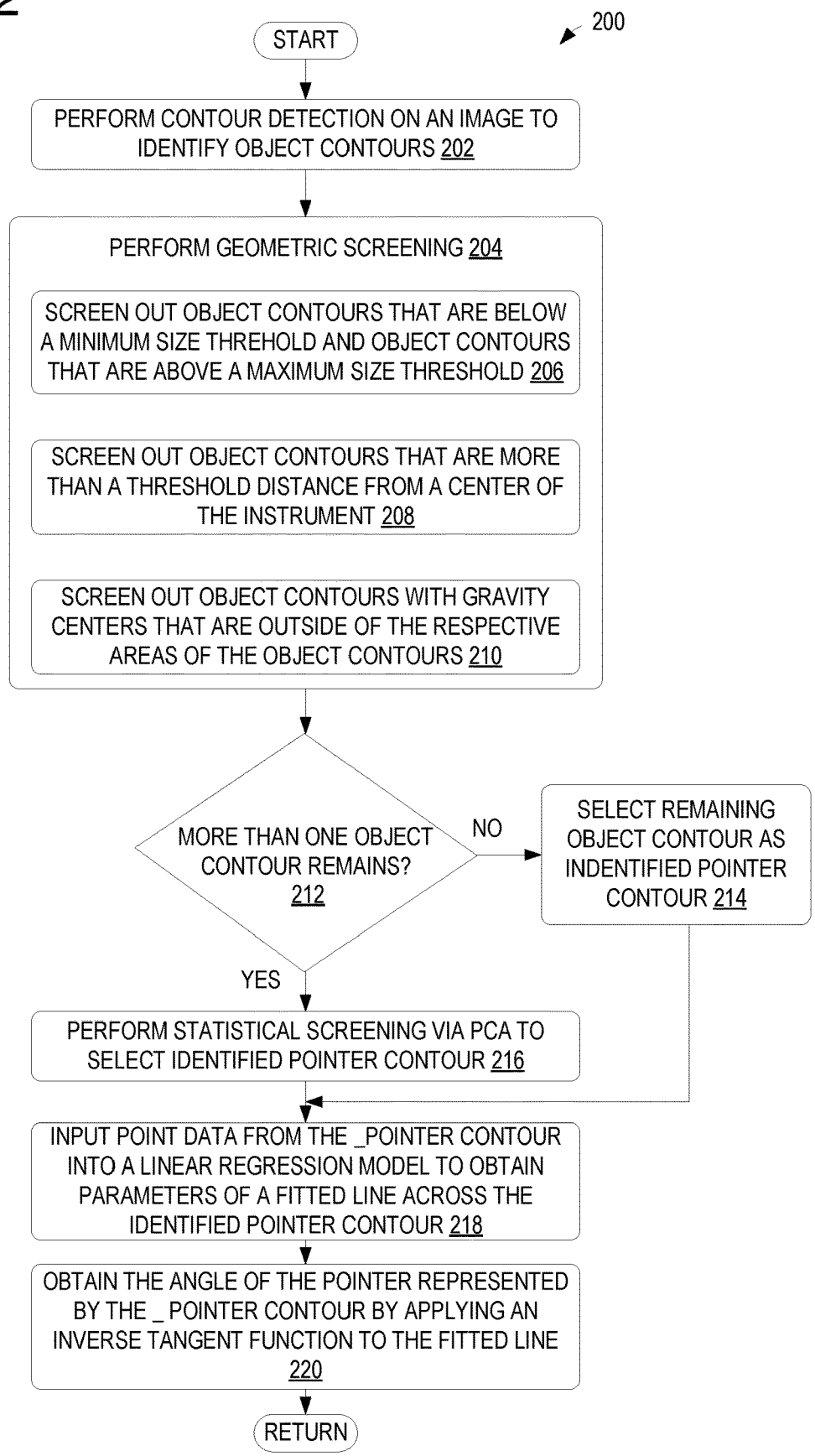
FIG. 2 is a flow chart of an example method of identifying a pointer and associated pointer properties in an image of an analog instrument.

FIG. 2 is a flow chart of an example method 200 for identifying a pointer in an image of an analog instrument. At 202, the method includes performing contour detection on an image (e.g., the image of the analog instrument) to identify a plurality of object contours. The image may correspond to a binary-value image (e.g., having edges visible therein) of the analog instrument. The binary-value image may have been previously transformed from an original image of the analog instrument and/or may be transformed as part of the execution of method 200 (e.g., prior to the contour detection). Contours of objects (e.g., objects formed within bounds of the edges in the binary-value image) may be detected in the binary-value image of edges. The contours detected at 202 may collectively correspond to a plurality of candidate pointer contours, to be screened and/or otherwise filtered and reduced to a single identified pointer contour.

Figure 4:
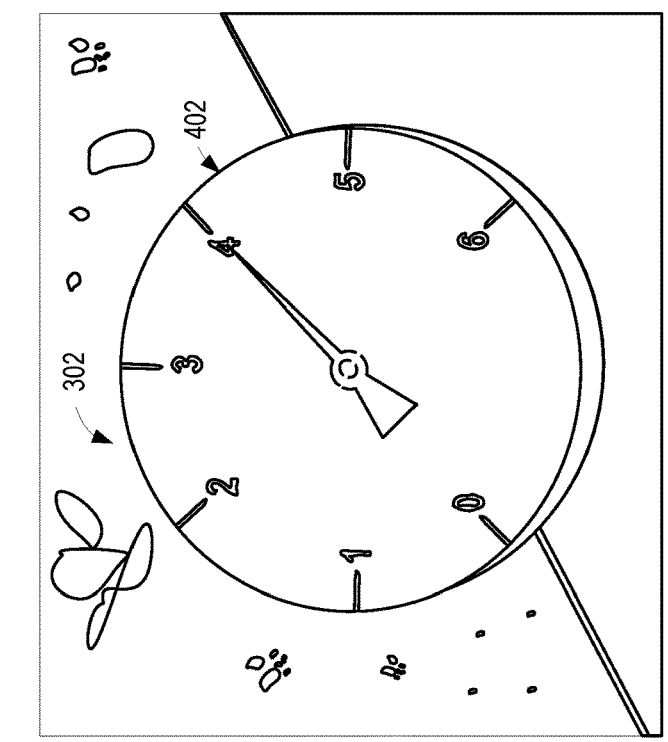
FIG. 4 is an example binary-value image of the analog instrument of FIG. 3 showing detected edges of the analog instrument.
Figure 3:
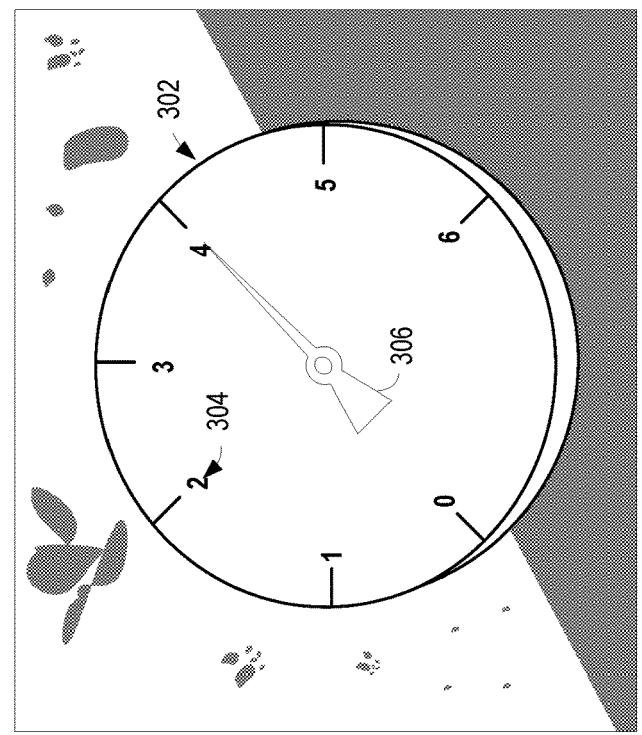
FIG. 3 is an example original image of an analog instrument.
Figure 5:
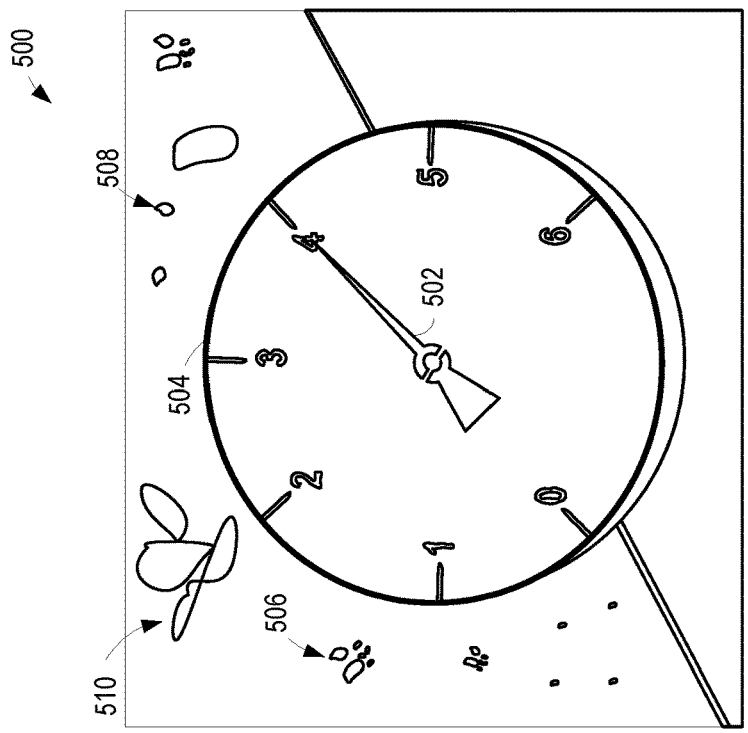
FIG. 5 is an example binary-value image of an analog instrument showing detected contours in the image.

Turning briefly to FIGS. 3-5, example images are shown relating to the above processes of method 200. For example, FIG. 3 shows an example of an original image 300 of an analog instrument 302 (e.g., an image of a physical instrument captured in the real-world). As shown, the analog instrument 302 includes a plurality of measurement value indicators 304 distributed around a circumference of the instrument and a pointer 306 that is movable to point to the measurement value indicators in correspondence to a measured parameter. FIG. 4 shows an example of a binary-value image 400 including edges 402 of the analog instrument 302 and other imaged elements. For example, the binary-value image 400 may be derived (e.g., transformed) from the original image 300 of FIG. 3. FIG. 5 shows identified object contours from the binary-value image (e.g., as a result of performing a contour identification process, such as the identification described above at 202 of FIG. 2). As shown, the identified contours include those associated with the pointer (e.g., 502), those associated with a boundary of the analog instrument (e.g., 504), as well as background objects (e.g., 506, 508, and 510). In order to recognize the pointer contour automatically, each of the contours may be considered as candidate contours that are subject to screening to narrow the candidates to only the contour(s) associated with the pointer.

The screening may be performed in phases in order to reduce computing resource usage for contour evaluation. Returning to FIG. 2, the screening process may include a first phase, in which the candidate pointer contours are screened according to associated geometric parameters (e.g., geometric screening), as indicated at 204. The geometric screening may include screening techniques in which candidate pointer contours are screened based on geometric area, distance parameters, and/or gravity center parameters. In a first example of geometric area-based screening, the geometric screening includes screening out object contours that are below a minimum size threshold and object contours that are above a maximum size threshold, as indicated at 206. In this way, the method screens out contours of small spots or holes in the background, as well as large objects that are not consistent with typical pointer sizes. The minimum and maximum size thresholds may be selected to define a range of geometric areas therebetween, which correspond to geometric areas that are neither too large nor too small to represent a pointer. The minimum and maximum size thresholds may be selected such that the defined range of geometric areas therebetween is a relative fraction of an area of the instrument contour (e.g., since the pointer is likely to be smaller than the instrument in order to fit within the instrument).

Figure 6:
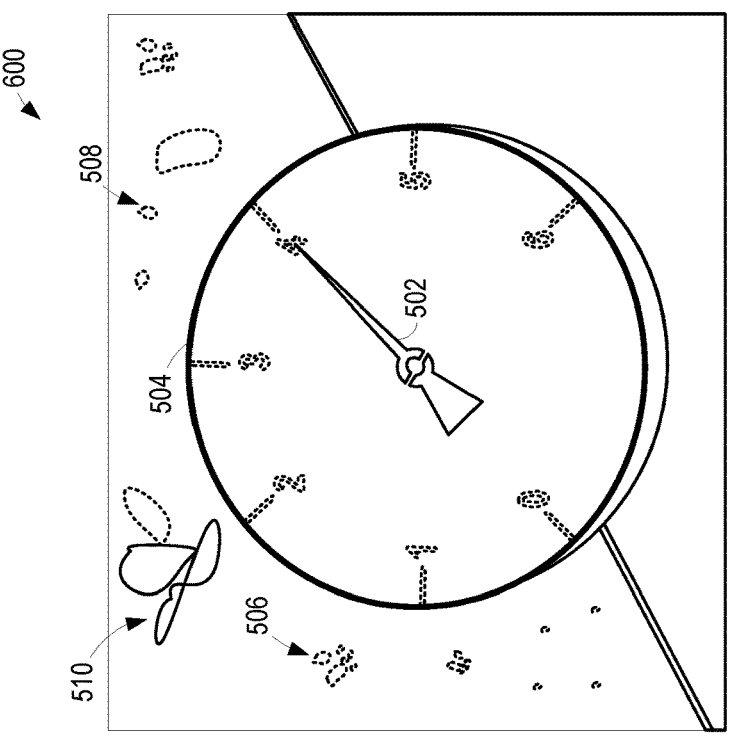
FIG. 6 is an example binary-value image of the analog instrument of FIG. 5 showing remaining detected contours after a geometric area-based screening of contours in the image.

FIG. 6 shows an example image 600 representing a result of geometric screening based on geometric area of the candidate contours (e.g., a result of performing the screening described above at 206 in FIG. 2). As shown, contours 506 and 508 are screened out (e.g., represented with dashed edges) due to the small (e.g., below a threshold) size of the contours.

Returning to FIG. 2, in a second example of distance parameter-based screening, the geometric screening includes screening out object contours that are more than a threshold distance from a geometric center of the instrument, as indicated at 208. In this way, the method screens out contours that are in a location that is inconsistent with most instrument pointers (e.g., which are likely to extend from or pass through a center of the instrument). The location of the object contour used for comparison to the distance threshold may include the location of the gravity center of the object contour and/or the location of one or more edges of the object contour.

Figure 7:
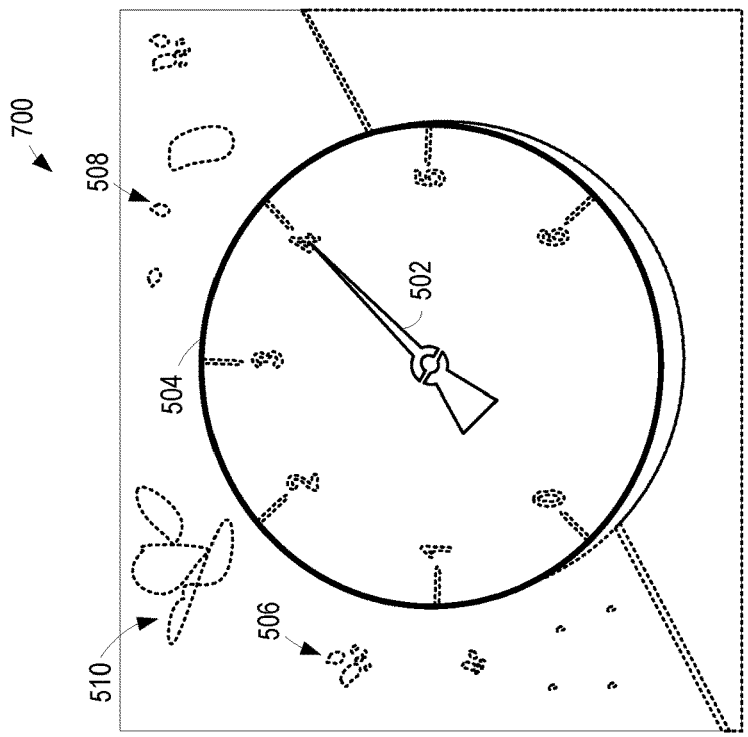
FIG. 7 is an example binary-value image of the analog instrument of FIG. 6 showing remaining detected contours after a further, distance-based screening of contours in the image.

FIG. 7 shows an example image 700 representing a result of further geometric screening based on a distance parameter of the remaining candidate contours (e.g., after screening the candidate contours that were remaining after the geometric area-based screening described above with respect to operation 206 of FIG. 2 and/or image 600 of FIG. 6). As shown, contour 510 is screened out (e.g., represented with dashed edges) due to the location of the contour 510 outside of the boundary of the instrument contour (shown at 504). For example, contour 510 may be screened out due to a gravity center of the contour 510 having a distance from a center of the instrument contour 504 that is greater than a radius of the instrument contour 504.

Returning to FIG. 2, in a third example of gravity center parameter-based screening, the geometric screening includes screening out object contours with gravity centers that are outside of the respective areas of the object contours, as indicated at 210. In this way, the method screens out contours that are shaped inconsistently with most instrument pointers (e.g., which are likely to have a gravity center within the geometric area of the pointer).

The above examples of geometric area-based screening, distance parameter-based screening, and gravity center parameter-based screening may be performed in any order to reduce the number of candidate pointer contours. In some examples, the order of techniques is selected based on an estimated effectiveness of each technique in reducing to candidate pointer contours (e.g., an amount and/or efficiency of candidate pointer contour reduction, where efficiency may be measured in computing resources used for reduction versus number of candidate pointer contours reduced) and/or an amount of resources used for analyzing each contour using the different techniques (e.g., a most resource-intensive technique may be performed last, after contours have been screened out using the other techniques, so as to be performed on a fewest number of contours). The estimated effectiveness of each technique may be based on historical data regarding prior geometric screening operations and/or features of the image and/or analog instrument/pointer (e.g., amount of noise/artifacts in the image, size of the analog instrument and/or pointer, size of the analog instrument relative to overall size of the image, range of color/intensity of pixels in the image, number of detected contours in the image, maximum/minimum contour sizes detected in the image, distribution of contours detected in the image, etc.). For example, for images that have more than a threshold number of artifacts (e.g., the image has a large signal-to-noise ratio), indicating the presence of many small contours that are irrelevant to the pointer, the geometric area-based screening may be performed first, since the high level of noise may indicate that a majority of the contours are much smaller than a targeted size range for the pointer contour. In another example, for images in which the noise level is lower than the threshold and the analog instrument occupies less than a threshold percentage of the overall image space (e.g., less than 30% of the image space), the distance parameter-based screening may be performed first, since the majority of the irrelevant (non-pointer) contours may be present outside of the analog instrument area/contour. The above examples are understood to be illustrative and non-exhaustive, and other approaches may be used to determine an order for performing the geometric screening.

The number of different techniques performed may be dependent on properties of the image and the analog instrument/pointer, as the geometric screening may be interrupted when the reduction results in a single remaining candidate pointer contour. For example, a number/amount of remaining candidate pointer contours may be evaluated after performing each geometric screening technique, and one or more of the geometric screening techniques may be skipped (e.g., not performed) responsive to the evaluation revealing that a single candidate pointer contour remains.

After performing the geometric screening, the method includes, at 212, determining if more than one object contour remains as a candidate pointer contour. If there are not multiple object contours remaining after the geometric screening (e.g., "NO" at 212), the method includes selecting the remaining object contour as the identified pointer contour, as indicated at 214. It is to be understood that the selection of the pointer contour at 214 is performed when one object contour remains. The geometric screening may be configured to ensure that at least one object contour remains by stopping the screening when a single candidate pointer contour remains (as described above) and, for example, by adjusting parameters of the screening and at least partially re-screening the candidate pointer contours in the event that a screening technique screened out all candidate pointer contours.

If multiple object contours remain after the geometric screening (e.g., "YES" at 212), the method includes performing a statistical screening technique via principal component analysis (PCA) to select an identified pointer contour, as indicated at 216. For example, the selected identified pointer contour may be selected based on having a greatest contribution rate of the first principal component of the candidate pointer contours that remain after geometric screening. The statistical screening may be computing resource-intensive. Performing the PCA after geometric screening reduces the number of candidate pointer contours analyzed, thereby reducing (or eliminating, if the geometric screening results in a single remaining candidate pointer contour) the amount of computing resources used for the PCA.

The statistical criterion used for the PCA is based on the experience that the shape of the pointer contour, particularly the pointer tip, is more similar to a straight and slender line than non-pointer contours. For each remaining contour after the geometric screening, all the pixel points inside the contour areas are taken as data samples and the PCA is performed on these data to select the contour that most resembles a line. As an image is on a two coordinate axis system, there are two principal components. The contribution rate corresponding to each principal component through PCA may be listed, sorted in descending order. Therefore, each contour can be labeled by the greatest contribution rate in the principal component list. Among all the remaining contours after the above-described geometric screening criteria are applied, the contour with the greatest contribution rate of the first principal component may be recognized as the pointer contour. Table 1 shows non-limiting examples of PCA parameters for three exemplary contours and resulting selection of a contour based thereon. As demonstrated in Table 1, the contour2 is selected out of three contours because the pointer contour for contour2 has the greatest contribution rate of the first principal component. For example, the shape of the pointer contour is usually more similar to a straight and slender line than other contours remaining in the image.

TABLE 1

Screening Contours by PCA

| Contours | Principal Components | Contribution Rate | Contribution Rate of the first principal component | Pointer Contour |
|---|---|---|---|---|
| Contour1 | PC1 | 0.71 | 0.71 | x |
| | PC2 | 0.29 | | |
| Contour2 | PC1 | 0.96 | 0.96 | ✓ |
| | PC2 | 0.04 | | |
| Contour3 | PC1 | 0.82 | 0.82 | x |
| | PC2 | 0.18 | | |

Figure 8:
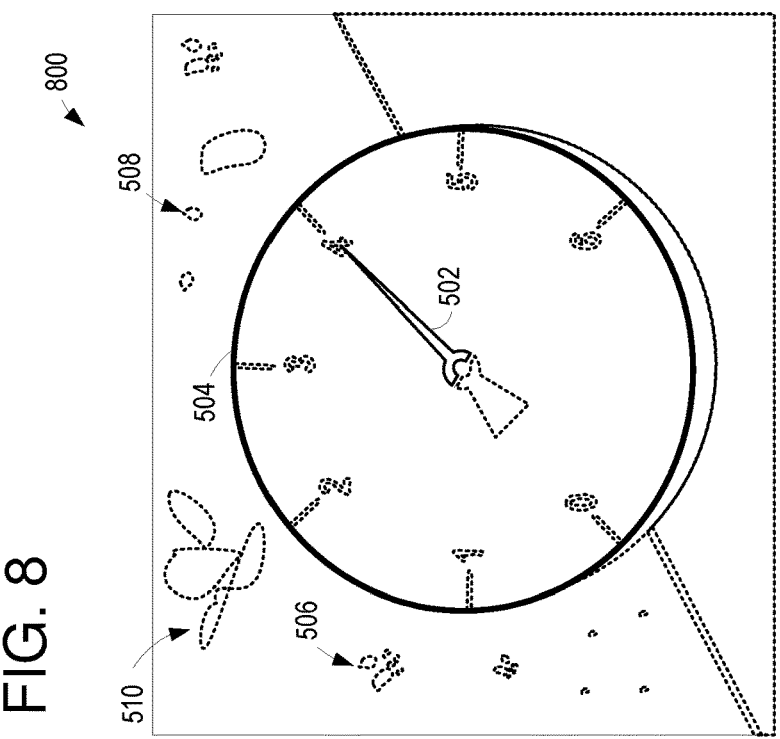
FIG. 8 is an example binary-value image of the analog instrument of FIG. 7 showing a pointer tip detected via Principal Component Analysis (PCA).

FIG. 8 shows an example image 800 representing a result of further screening using PCA, as described above with respect to operation 216 of FIG. 2. As shown, the tip of the pointer has been recognized. If the pointer contour is not divided into two parts, the whole pointer will be recognized, and then the end that is more distant from the instrument center will be recognized as the pointer tip.

Once the pointer contour is determined (e.g., the identified pointer contour is selected at 214 or 216), the method includes inputting point data from the identified pointer contour into a linear regression model to obtain parameters of a fitted line across the identified pointer contour, as indicated at 218. At 220, the method includes obtaining the angle of the pointer represented by the identified pointer contour by applying an inverse tangent function to the fitted line.

Figure 10:
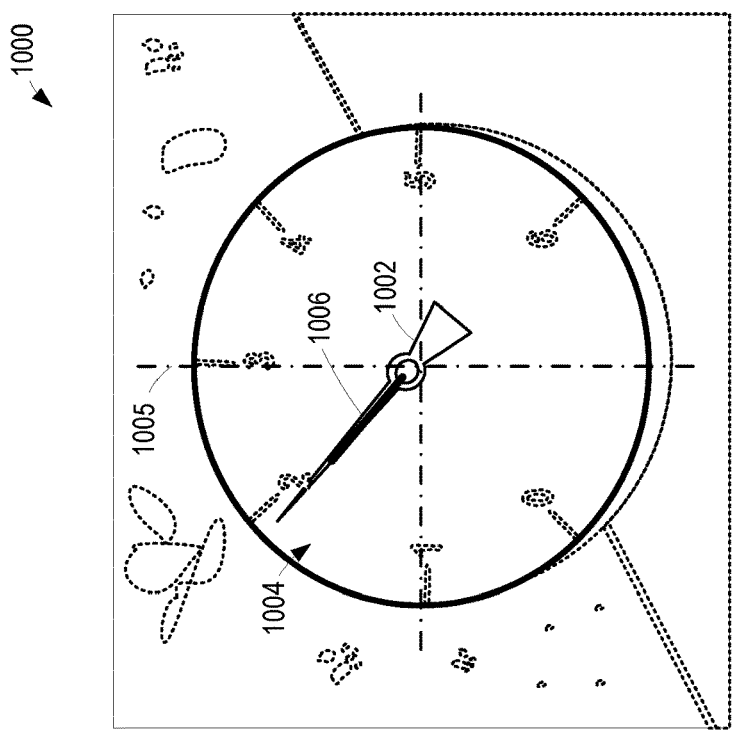
FIG. 10 is an example binary-value image showing a detected pointer used to determine a slope and location of the pointer relative to an associated analog instrument.
Figure 9:
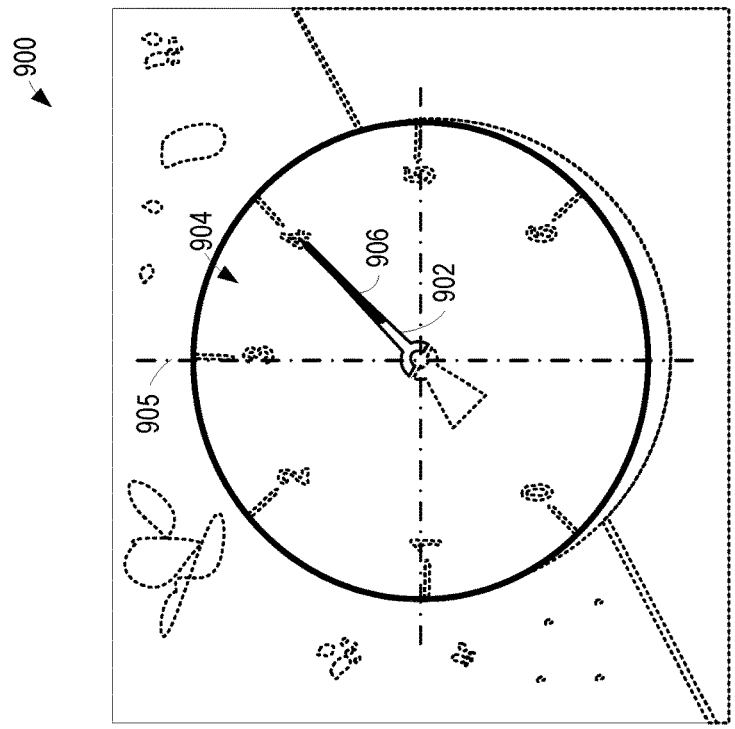
FIG. 9 is an example binary-value image showing a detected pointer tip used to determine a slope and location of a pointer relative to an associated analog instrument.

FIGS. 9 and 10 show examples relating to calculating the pointer angle of the identified pointer counter. In FIG. 9, the example image 900 illustrates a recognized pointer tip 902, which is located in a quadrant 904 of the analog instrument. The quadrant 904 may be designated by axes 905, which are computed as being aligned with a center of the analog instrument. The quadrant 904 in which the pointer tip 902 is located and the slope of the pointer tip 902 may be identified and calculated via linear regression as described above at 218 and 220 of FIG. 2. For example, the pixel points of the pointer tip 902 to generate a fitted line 906. It is to be understood that the identification of the quadrant in which the pointer tip is located is an illustrative example of identifying a location of the pointer tip relative to the geometry of the analog instrument. In other examples, the location of the pointer tip may be identified in terms of another portioning approach, which may be selected based on the shape of the analog instrument.

In FIG. 10, the example image 1000 illustrates a recognized full pointer 1002, the tip of which is located in quadrant 1004 of the analog instrument. The quadrant 1004 may be designated by axes 1005, which are computed as being aligned with a center of the analog instrument. As described above, the tip may be identified as the point of the contour that is farthest from a center of the analog instrument. Accordingly, a similar process as described with respect to FIG. 9 may be performed to identify the quadrant 1004 in which the tip of the pointer 1002 is located and the slope of the pointer 1002 using linear regression. For example, the pixel points of the pointer 1002 within the quadrant 1004 may be used to generate a fitted line 1006.

Although the contours of instrument examples in this disclosure are circular, the techniques described herein are not subject to the shape of the contours. In other words, the techniques of this disclosure are also applicable to the instrument of square or any other shape. Moreover, the disclosed features are applicable not only to the pointer recognition of particular instrument, but also applicable to all cases in which slender objects are to be discerned in an image.

Figure 11:
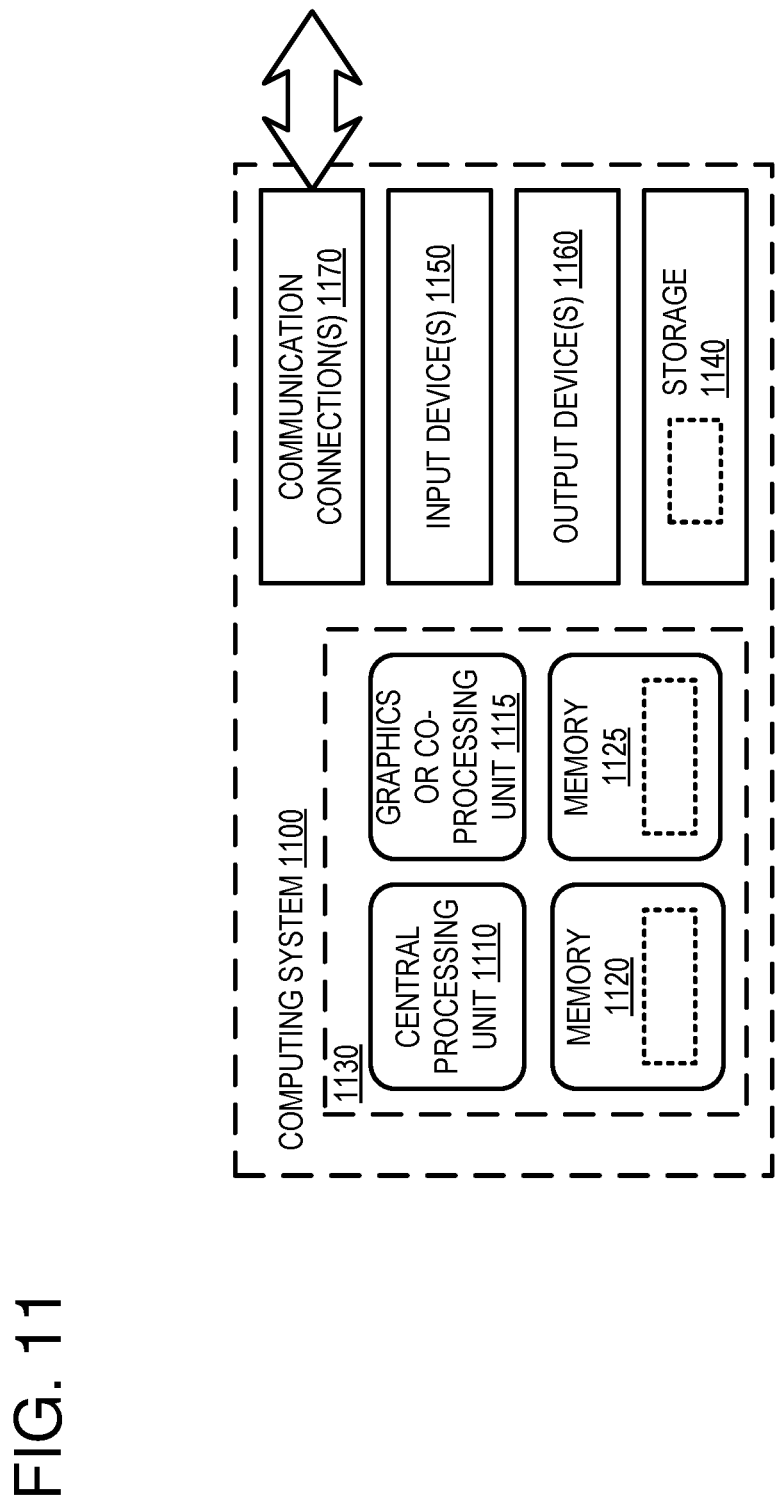
FIG. 11 is a diagram of an example computing system in which described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, memory 1120 and 1125 can store tester 212, constructor 216, and other components of FIG. 2 and tester 410, constructor 420, and other components of FIG. 4.

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information and which can be accessed within the computing system 1100. The storage 1140 stores instructions for the software 1180 implementing one or more innovations described herein. For example, storage 1140 can store tester 212, constructor 216, and other components of FIG. 2 and tester 410, constructor 420, and other components of FIG. 4.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 12:
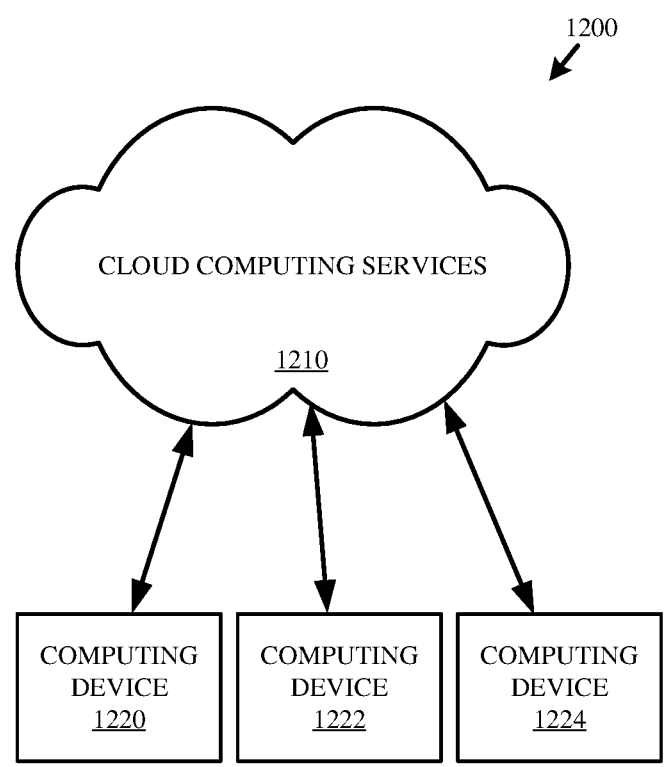
FIG. 12 is an example cloud computing system that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosure presents techniques of pointer contour recognition and its angle calculation based on computer vision techniques. The screening criteria of this disclosure are able to distinguish the pointer contour from numerous contours in the background, with accuracy greater than 99%. The technique of pointer angle calculation is able to determine the slope of the line where the pointer lies. Integrating the techniques of this disclosure, the features of software products of intelligent enterprise will be largely improved as the software is able to read the instrument image in an automatic way, without human's intervention. Thereby, this disclosure can largely improve the intelligence level of products.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method for identifying a pointer in an image of an analog instrument, the method comprising:
   identifying an instrument contour in the image corresponding to the analog instrument;
   identifying a plurality of candidate pointer contours in the image;
   screening the plurality of candidate pointer contours in the image using one or more geometric property screening techniques, the one or more geometric property screening techniques being based on an evaluation of a geometric area, a distance parameter, and/or a gravity center of the plurality of candidate pointer contours; and
   responsive to determining that the number of candidate pointer contours remaining after the screening is greater than one, performing principal component analysis (PCA) to select an identified pointer contour from among the reduced plurality of candidate pointer contours, the identified pointer contour having the greatest contribution rate of a first principal component of the reduced plurality of candidate pointer contours.

2. The method of claim 1, wherein the one or more geometric property screening techniques includes identifying a subset of the plurality of candidate pointer contours based on the geometric area of each of the plurality of candidate pointer contours, each of the pointer contours in the subset having a respective geometric area that is between a selected minimum area and a selected maximum area.

3. The method of claim 2, wherein the selected minimum area and the selected maximum area are selected to define a corresponding area range that is a fraction of an area of the instrument contour.

4. The method of claim 1, wherein the one or more geometric property screening techniques includes identifying a subset of the plurality of candidate pointer contours based on a distance parameter of each of the plurality of candidate pointer contours, each of the pointer contours in the subset having a distance between a respective gravity center of the pointer contour and a geometric center of the instrument contour that is less than a selected threshold distance.

5. The method of claim 1, wherein the one or more geometric property screening techniques includes identifying a subset of the plurality of candidate pointer contours based on a gravity center location of each of the plurality of candidate pointer contours, each of the pointer contours in the subset having a gravity center that is inside of the respective pointer contour.

6. The method of claim 1, wherein the image is a binary-value image of the analog instrument.

7. The method of claim 1, further comprising applying a linear regression model to pixel points in the contour area of the identified pointer contour and determining a slope and angle of an associated pointer represented by the identified pointer contour based on an output of the linear regression model.

8. The method of claim 7, wherein the linear regression model is a machine learning model trained by the pixel points in the contour area of the identified pointer contour.

9. The method of claim 7, further comprising determining an analog instrument reading based on the determined slope and angle of the identified pointer contour and providing the analog instrument reading to a selected system.

10. The method of claim 9, wherein the selected system comprises a machine learning system and/or a connected device, the method further comprising controlling the connected device based on the analog instrument reading.

11. A system for pointer recognition in an image of an analog instrument, the system comprising:
one or more memories;
one or more processing units coupled to the one or more memories;
one or more computer readable storage media storing instructions that, when loaded into the one or more memories, cause the one or more processing units to perform image analysis operations for:
identifying an instrument contour in the image corresponding to the analog instrument;
identifying a plurality of candidate pointer contours in the image;
screening the plurality of candidate pointer contours in the image using at least one geometric property screening technique to generate a reduced subset of candidate pointer contours, the at least one geometric property screening technique being based on an evaluation of a geometric area, a distance parameter, and/or a gravity center of the plurality of candidate pointer contours;
selecting an identified pointer contour from among the candidate pointer contours in the reduced subset, where the identified pointer contour is selected as the candidate pointer contour in the reduced subset when the reduced subset includes a single candidate pointer contour, and where the identified pointer contour is selected by performing principal component analysis (PCA) when the reduced subset includes more than one candidate pointer contours, the identified pointer contour selected by performing PCA having the greatest contribution rate of a first principal component of the candidate pointer contours in the reduced subset; and
applying a linear regression model to pixel points in the contour area of the identified pointer contour and determining a slope and angle of an associated pointer represented by the identified pointer contour based on an output of the linear regression model.

12. The system of claim 11, wherein the evaluation of the geometric area includes comparing a geometric area of each of the plurality of candidate pointer contours to a selected minimum area and a selected maximum area, each of the candidate pointer contours in the reduced subset having a respective geometric area that is between a selected minimum area and a selected maximum area.

13. The system of claim 12, wherein the selected minimum area and the selected maximum area are selected to define a corresponding area range that is a fraction of an area of the instrument contour.

14. The system of claim 11, wherein the evaluation of the distance parameter includes comparing a distance between a respective gravity center of each candidate pointer contour and a geometric center of the instrument contour to a selected threshold distance, and wherein each of the candidate pointer contours in the reduced subset have a distance between the respective gravity center of the candidate pointer contour and the geometric center of the instrument contour that is less than the selected threshold distance.

15. The system of claim 11, wherein the evaluation of the gravity center includes determining a location of the gravity center of each candidate pointer contour relative to boundaries of the respective candidate pointer contour, each of the candidate pointer contours in the reduced subset having a respective gravity center location that is inside of the respective candidate pointer contour.

16. The system of claim 11, wherein the linear regression model is a machine learning model trained by the pixel points in the contour area of the identified pointer contour.

17. The system of claim 11, wherein an analog instrument reading based on the determined slope and angle of the identified pointer contour is provided as input to a machine learning system, and wherein the input analog instrument reading is configured to train the machine learning system and/or to trigger output of a result of a machine learning operation of the machine learning system, and wherein the result of the machine learning operation of the machine learning system includes a control signal to control the system and/or a connected device based on the determined slope and angle of the identified pointer contour.

18. One or more non-transitory computer-readable storage media storing computer-executable instructions for causing a computing system to perform a method of identifying a pointer in an image of an analog instrument, the method comprising:
identifying a plurality of candidate pointer contours in the image;
screening the plurality of candidate pointer contours in the image based on an evaluation of geometric parameters, the geometric parameters including a geometric area, a distance parameter, and a gravity center of the plurality of candidate pointer contours to generate a reduced subset of candidate pointer contours;

in a first condition, in which the reduced subset of candidate pointer contours includes only one remaining candidate pointer contour, selecting the one remaining candidate pointer contour as an identified pointer contour;

in a second condition, in which the reduced subset of candidate pointer contours includes multiple remaining candidate pointer contours, performing principal component analysis (PCA) to select the identified pointer contour from among the remaining candidate pointer contours in the reduced subset, the identified pointer contour having the greatest contribution rate of a first principal component of the remaining candidate pointer contours in the reduced subset; and applying a linear regression model to pixel points in the contour area of the identified pointer contour and determining a slope and angle of an associated pointer represented by the identified pointer contour based on an output of the linear regression model.

19. The one or more non-transitory computer-readable storage media of claim 18, wherein the evaluation of the geometric area, the distance parameter, and the gravity center is performed sequentially in an order that is selected based on an estimated resource usage of each of the geometric parameters and/or an estimated candidate contour reduction achieved by evaluation of each of the geometric parameters.

20. The one or more non-transitory computer-readable storage media of claim 18, wherein the instructions further cause the computing system to identify a pointer tip as corresponding to an end portion of the identified pointer contour that is most distant from a geometric center of the analog instrument.

\* \* \* \* \*